UNITED STATES PATENT OFFICE.

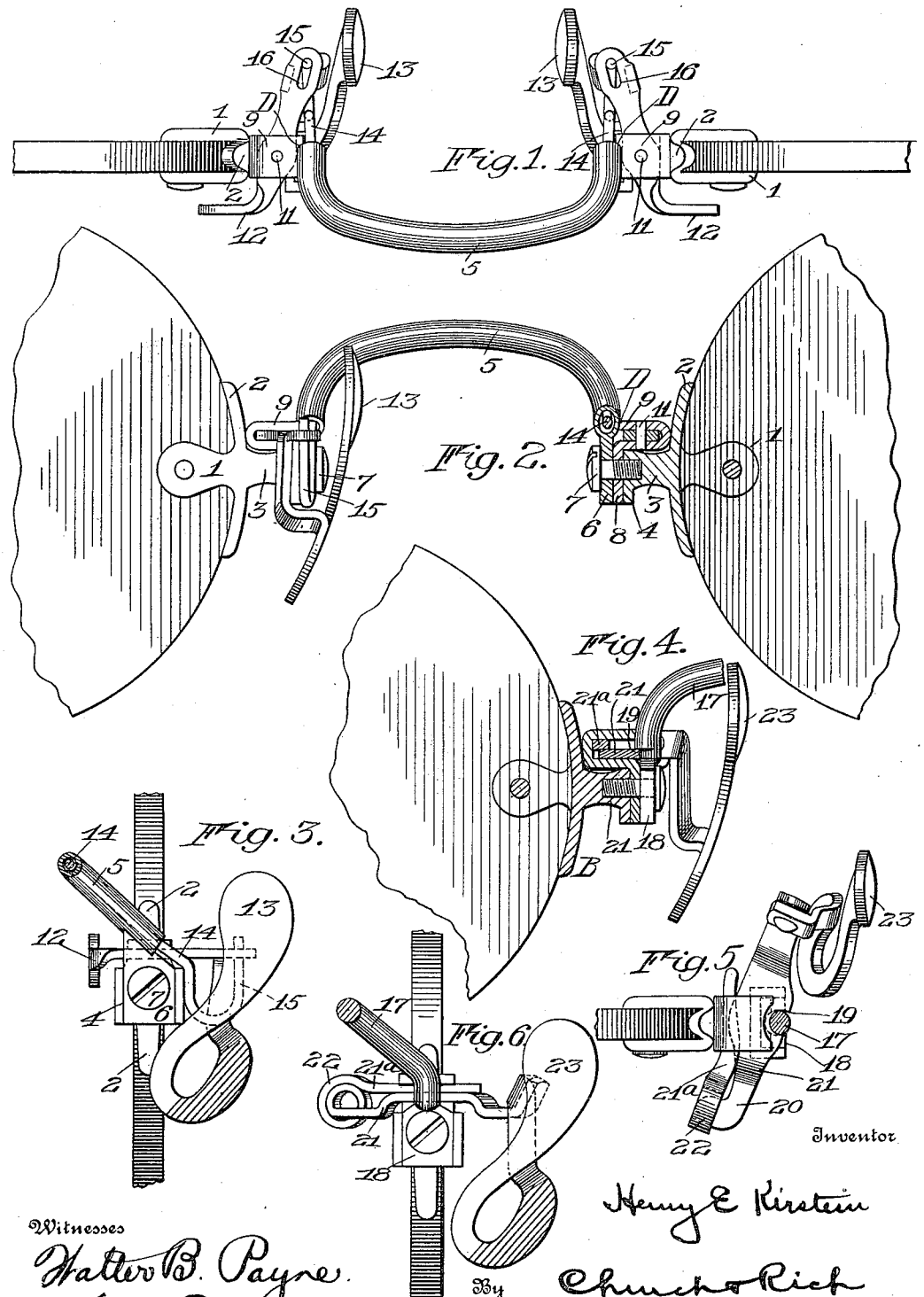

HENRY E. KIRSTEIN, OF ROCHESTER, NEW YORK, ASSIGNOR TO E. KIRSTEIN SONS CO., OF ROCHESTER, NEW YORK, A CORPORATION OF NEW YORK.

EYEGLASSES.

1,017,004.        Specification of Letters Patent.     Patented Feb. 13, 1912.

Application filed August 14, 1907. Serial No. 388,484.

*To all whom it may concern:*

Be it known that I, HENRY E. KIRSTEIN, of Rochester, in the county of Monroe and State of New York, have invented certain new and useful Improvements in Eyeglasses; and I do hereby declare the following to be a full, clear, and exact description of the same, reference being had to the accompanying drawings, forming a part of the specification, and to the reference-numerals marked thereon.

The present invention, which relates to eyeglasses of the type in which finger pieces are employed for positioning the nose guards, has for an object to provide an improved construction which will permit the use of lens mounts of different lengths in order that the lens centers may be alined with the centers of the pupils of the eyes of a wearer, and in which the operating levers are positioned so that they will be inconspicuous.

To these and other ends the invention consists in certain improvements and combinations all as will be hereinafter more fully described the novel features being pointed out in the claims at the end of the specification.

In the drawings, Figure 1 represents a top view of a pair of eyeglasses embodying one form of my invention, the lenses being shown only partially. Fig. 2 represents a rear view of the same embodiment, one end of the bridge and adjacent parts being shown in section. Fig. 3 represents a central transverse section through the eyeglasses. Fig. 4 represents a section of another embodiment in the plane of the lenses and through one of the lens mounts and a nose guard with its attaching bracket. Fig. 5 represents a view of the same embodiment showing the lens mount, the nose guard and the attaching member as seen from above, and the nose guard in horizontal section. Fig. 6 is a central transverse section through the embodiment shown in Figs. 4 and 5.

The invention is embodied in the construction shown in Figs. 1 to 3 where is employed a mounting comprising a support consisting of a bridge and a pair of lens mounts or attaching devices and a pair of nose guards. The lens mounts in this instance are of the usual commercial form and each comprises a pair of lens ears 1 connected by a lens bearing portion 2 having a post 3 extending therefrom with a vertical seat 4 at its outer end; while the bridge preferably has a hollow central portion 5 and vertically arranged attaching ends 6 detachably secured in the seats of the lens mounts by fasteners, such as screws 7 which pass through perforations in the ends.

Arranged on the support are brackets each of which preferably comprises an attaching member in the form of a vertically arranged arm 8 adapted to fit in a lens seat and to be held therein by the fasteners 7. Carried by the attaching arm preferably on the upper end thereof is an offset portion 9 which lies in the plane of the lenses or lens attaching devices and above the latter and is preferably U-shaped and horizontally arranged, the attaching arm being secured to its lower arm and the free end of its upper arm being notched at D so as to receive the adjacent portion of the bridge to prevent this arm from being displaced laterally. Connecting arms of the U-shaped portion of the bracket is a pivot 11 on which the nose guard is swingingly mounted.

The nose guards are each in the form of a lever projecting forwardly and rearwardly from the support and mounted on the pivot pin 11, the forwardly projecting portion 12 serving as a finger piece or operating arm and the rearwardly projecting portion carrying a suitable nose bearing portion 13, which is positioned on the nose by a spring 14. This spring extends through the hollow portion of the bridge and has its ends extended upwardly at 15 and passed through slots 16 in the rear extension of the levers, thus providing a sliding engagement between the spring and the nose guards.

The invention is also embodied in the construction shown in Figs. 4 to 6 wherein the lens mounts B are the same as in Figs. 1 to 3 and the bridge has its central portion 17 made of round stock and its ends formed into vertically arranged attaching arms 18. The brackets are the same as in the first described embodiment, except that the pivot pin is omitted, while the nose guards are in the form of levers notched at 19 on their sides nearest the bridge and each having its forwardly extending operating arm 20 bent downwardly at 21 and provided with an upper, rearwardly extending spring arm 21ª which is connected thereto by a vertical coil or loop 22, and has its free end slidingly engaging within the bracket so as to position the nose bearing portion 23 arranged at the rear of the lever, and to retain the nose guard on its bracket by causing the walls of the notch to bear against the proximate side of the bridge. The nose bearing portion is pivotally mounted on the rear end of the lever and is moved to the nose by the spring arms 21 and away from the nose by means of the forwardly projecting arm 20.

From the foregoing it will be apparent that I have provided an eyeglass mounting in which the lens mounts may be replaced by others of different lengths without affecting the distance between the guards and in which the brackets by being positioned beyond the ends of the bridge in the vertical planes of the lens attaching devices, that is, by acting as means for supporting the nose guards in planes beyond the ends of the bridge, provide an inconspicuous mounting. It will be further apparent that the nose guards with their brackets may form a separate article of manufacture to be used in combination with some types of lens mounts and bridges now on the market.

I claim as my invention.

1. In an eyeglass mounting, the combination with a support embodying a bridge and lens-attaching devices detachably connected to the bridge, of brackets independent of the lens-attaching devices arranged over the latter, and nose guards mounted to swing substantially in a horizontal plane on the brackets.

2. In an eyeglass mounting, a bridge, lens-attaching devices detachably connected thereto, brackets independent of the lens-attaching devices each comprising a vertically arranged attaching arm by which it is secured and an outwardly offset portion extending laterally from the attaching arm, and nose guards mounted to swing substantially in a horizontal plane, supported on the offset portion and each having a forwardly extending operating arm.

3. In an eyeglass mounting, lens mounts having vertically arranged seats, a bridge secured in the seats, brackets each comprising a vertically arranged attaching arm secured in one of the seats, and a horizontal extending offset portion, and nose guards each swingingly mounted on the offset portion of a bracket to move substantially in a horizontal plane and having a forwardly extending operating arm.

4. In an eyeglass mounting, a bridge, lens mounts detachably secured thereto, nose guards mounted to swing substantially in a horizontal plane and having forwardly extending operating arms, and brackets for supporting the guards offset outwardly from the ends of the bridge, and extending in the direction of the lenses, said offset portion being provided with vertical pivots for the guards.

5. The combination of a bracket embodying a vertically extending attaching arm and a horizontal U-shaped portion at one end of said arm, with a nose guard arranged between the arms of the U-shaped portion.

6. The combination with a support embodying a bridge and lens mounts detachably secured thereto, of brackets each comprising a horizontal U-shaped portion arranged over a lens mount and having an arm secured to the support and the free end of the other arm notched to receive the bridge, and nose guards each mounted between the arms of the U-shaped portion of a bracket.

7. The combination of a bracket embodying a horizontally arranged U-shaped portion, the free end of the upper arm being notched and the lower arm having an attaching arm, with a nose guard mounted between the arms.

8. The combination of a bracket embodying a horizontally arranged U-shaped portion, the free end of the upper arm being notched and the lower arm having an attaching arm and a pivot pin connecting the arms, with a nose guard mounted between the arms.

9. The combination of a bracket having a portion adapting it for attachment to an eyeglass mounting, and a portion offset outlarly extending portion, with a nose guard mounted to swing substantially in a horizontal plane on the latter portion of the bracket.

10. The combination with a bracket having a portion adapted for attachment to an eyeglass mounting, and a portion offset outwardly out of alinement with the attaching portion, of a nose guard having a forwardly extending operating portion and mounted to swing on the offset portion substantially in a horizontal plane.

HENRY E. KIRSTEIN.

Witnesses:
F. F. CHURCH,
HENRY W. HALL.

---

Copies of this patent may be obtained for five cents each, by addressing the "Commissioner of Patents, Washington, D. C."